United States Patent
Abrahams et al.

(10) Patent No.: US 11,490,035 B1
(45) Date of Patent: Nov. 1, 2022

(54) DYNAMIC ACTIVATION OF UNDER-DISPLAY CAMERA

(71) Applicant: International Business Machines Corporation, Armonk, NY (US)

(72) Inventors: Faried Abrahams, Laytonsville, MD (US); Kimberly Greene Starks, Nashville, TN (US); Kushal S. Patel, Pune (IN); Gandhi Sivakumar, Bentleigh (AU); Sarvesh S. Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/455,464

(22) Filed: Nov. 18, 2021

(51) Int. Cl.
  *H04N 5/268* (2006.01)
  *H04N 7/14* (2006.01)
  *H04N 5/225* (2006.01)
  *G06F 1/16* (2006.01)

(52) U.S. Cl.
  CPC .......... *H04N 5/268* (2013.01); *G06F 1/1686* (2013.01); *H04N 5/2258* (2013.01); *H04N 7/144* (2013.01)

(58) Field of Classification Search
  CPC ...... H04N 5/268; H04N 5/2258; H04N 7/144; G06F 1/1686
  See application file for complete search history.

(56) References Cited

U.S. PATENT DOCUMENTS

| | | | |
|---|---|---|---|
| 2015/0235240 | A1 | 8/2015 | Chang et al. |
| 2018/0307269 | A1* | 10/2018 | Pantel .................... G06F 1/1637 |
| 2020/0358963 | A1* | 11/2020 | Manzari ........... H04N 5/232941 |
| 2021/0026419 | A1* | 1/2021 | Kim ....................... G06F 1/1684 |
| 2021/0051253 | A1 | 2/2021 | Liu |
| 2021/0066409 | A1* | 3/2021 | Fan ....................... H01L 27/3234 |
| 2021/0176383 | A1* | 6/2021 | Kim ....................... G06F 3/0304 |

OTHER PUBLICATIONS

Porter, "Xiaomi's under-display camera tech will ship in smartphones next year", The Verge, Aug. 28, 2020, 3 pages, <https://www.theverge.com/2020/8/28/21405241/xiaomi-under-display-selfie-camera-no-notch-hole-punch-2021-mass-production>.
Byford, "Oppo unveils the world's first under-screen selfie camera", The Verge, Jun. 26, 2019, 3 pages, <https://www.theverge.eom/2019/6/26/18759380/under-display-selfie-camera-first-oppo-announcement>.
Zaninello, "What's the best place for a smartphone's front camera?", NEXTPIT, Dec. 15, 2018, 11 pages, <https://www.nextpit.com/best-place-for-smartphone-front-camera>.
(Continued)

*Primary Examiner* — Amy R Hsu
(74) *Attorney, Agent, or Firm* — Daniel M. Yeates

(57) ABSTRACT

A computer-implemented method is used for each of two or cameras on a device, where a first camera of the two or cameras is located under a display of the device. The method further includes defining, for each camera, a best effect region on the display including a first best effect region for the first camera. The method also includes identifying, for each of one or more feeds, a feed display area including a first feed display area, where each feed display location uses a portion of the display. The method includes activating the first camera for a first feed, wherein the first feed has a first feed display area that overlaps the first best effect region.

20 Claims, 7 Drawing Sheets

(56) References Cited

OTHER PUBLICATIONS

"Optimizing Network Applications for 5G", ericsson.com, Apr. 21, 2017, 3 pages, <https://www.ericsson.com/en/news/2017/4/optimizing-network-applications-for-5g>.
Zak, "How to Measure Altitude Using Your Phone", Maketecheasier, Aug. 11, 2021, 13 pages, <https://www.maketecheasier.com/measure-altitude-with-smartphone/>.
Mell et al., "The NIST Definition of Cloud Computing", Recommendations of the National Institute of Standards and Technology, NIST Special Publication 800-145, Sep. 2011, 7 pages.

* cited by examiner

DYNAMIC ACTIVATION OF UNDER-DISPLAY CAMERA

BACKGROUND

The present disclosure relates to video conferencing, and, more specifically, activating a particular under screen camera based on the relative location of a current speaker.

Camera placement on a mobile device is not a trivial matter. The location and number of cameras can drive usefulness. The location of the camera can affect not only the user of the device with the camera, but the experience of a remote device in communication with the device, such as during a video call.

SUMMARY

Disclosed is a computer-implemented method to dynamically activate under screen cameras. The method includes identifying a location for each of two or more cameras on a device, wherein a first camera of the two or more cameras is located under a display of the device. The method further includes defining, for each camera, a best effect region on the display including a first best effect region for the first camera. The method also includes identifying, for each of one or more feeds, a feed display area including a first feed display area, where each feed display location uses an area of the display. The method includes activating the first camera for a first feed, wherein the first feed has a first feed display area that overlaps the first best effect region. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
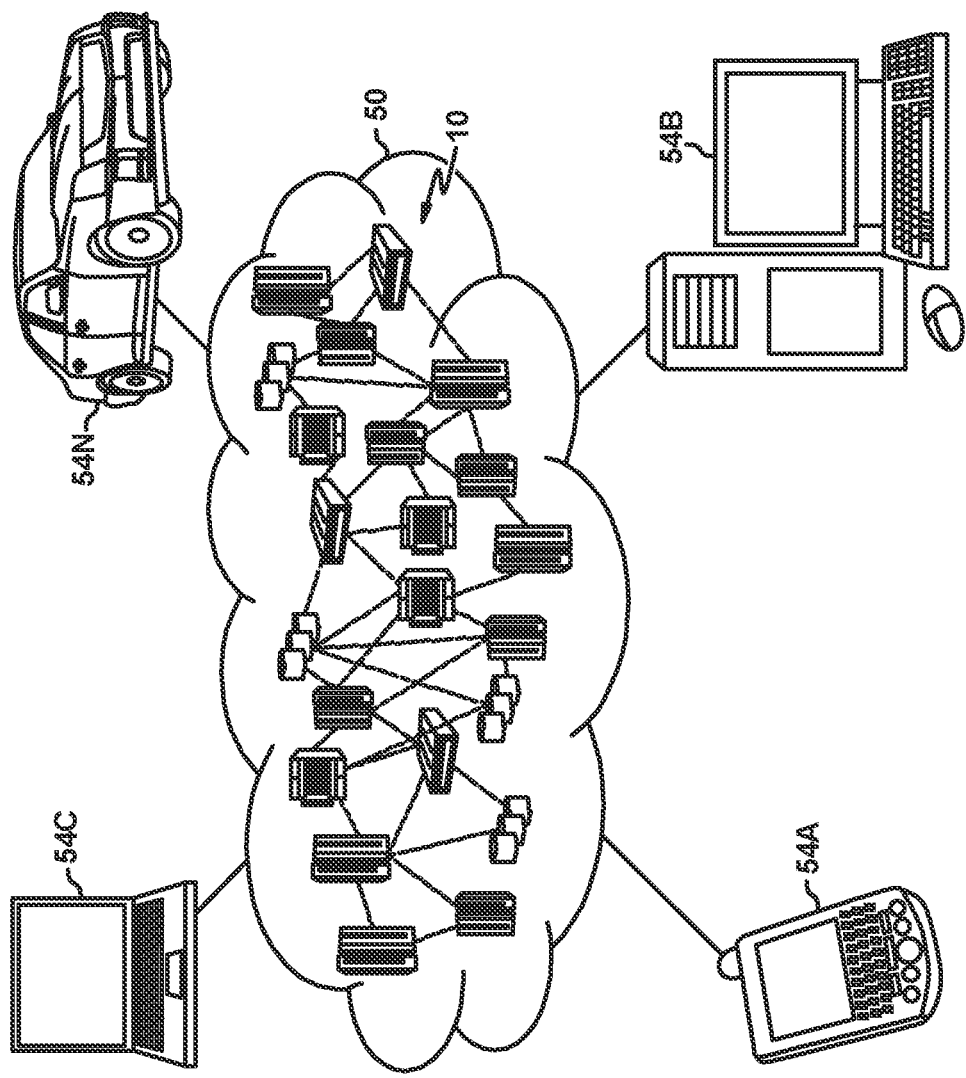
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
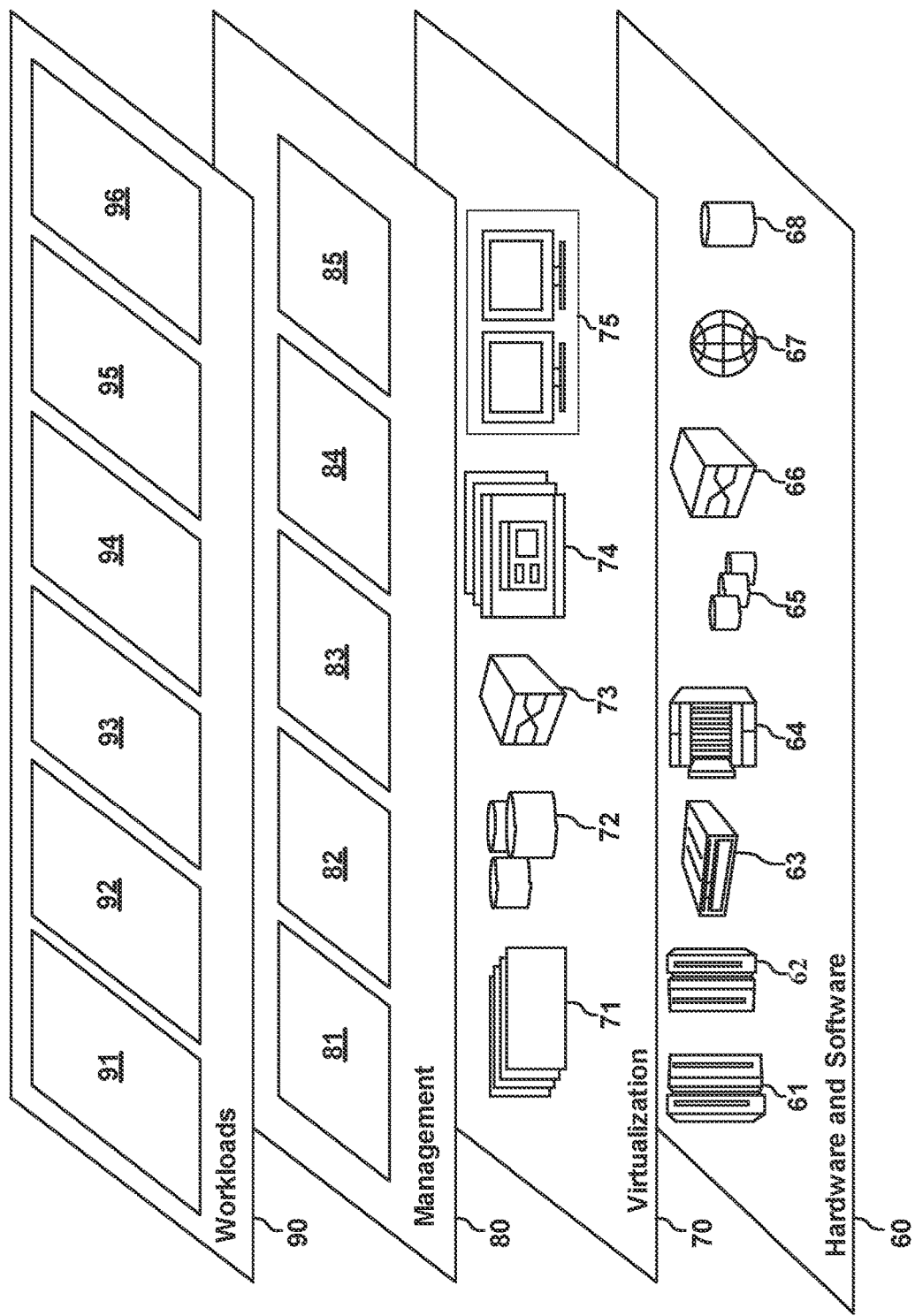
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and camera activation 96.

Data Processing System in General

Figure 3:
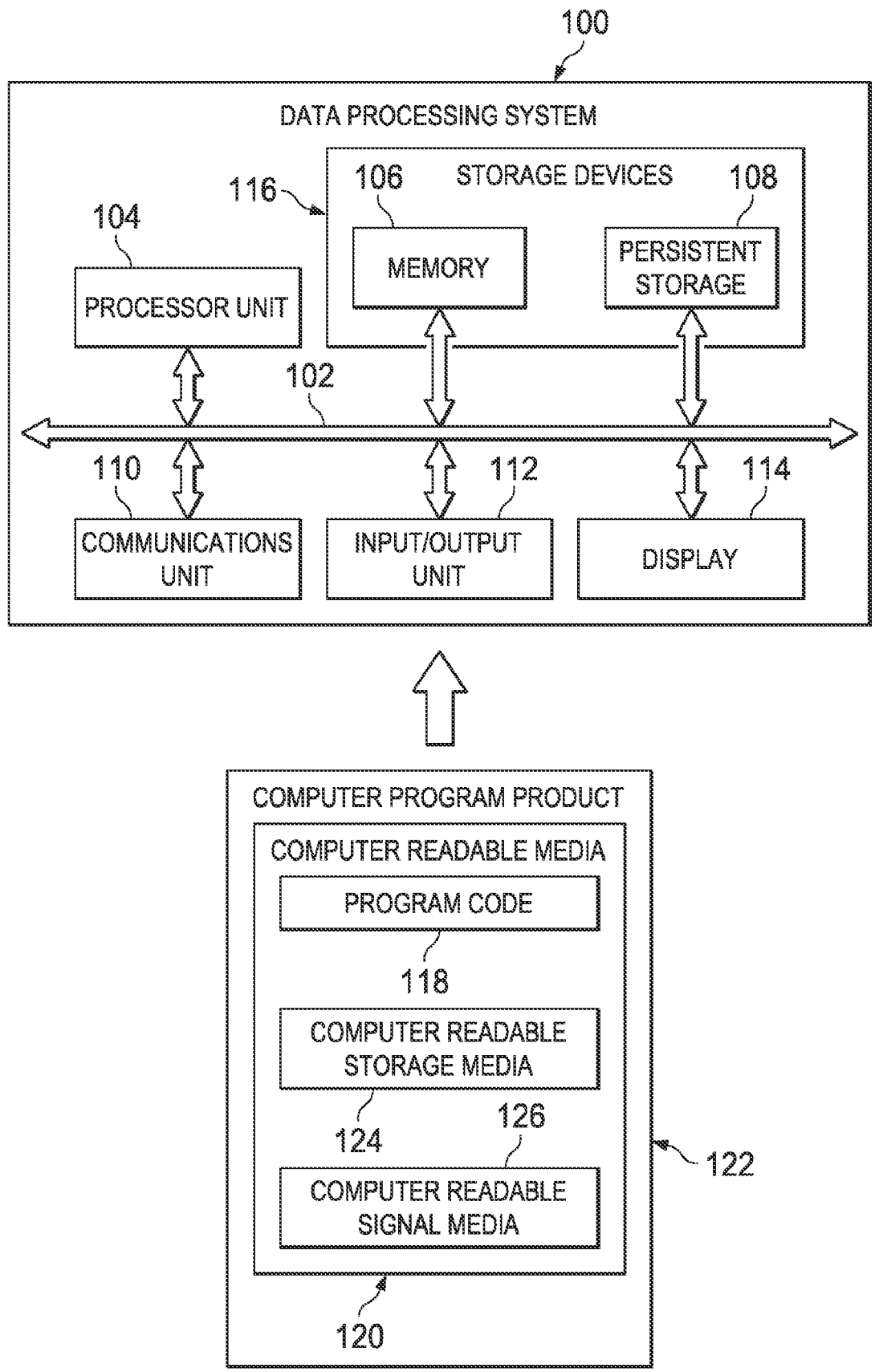
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Camera placement on a mobile device is not a trivial matter. The location and number of cameras can drive usefulness. The location of the camera can affect not only the user of the device with the camera, but the experience of a remote device in communication with the device, such as during a video call.

Video conferencing (and/or video chat, video call, etc.) has been steadily increasing in use and importance in modern social and workplace situations. However, video conferencing can still be less effective and feel less sincere/personal than in person communications. For example, there can be delays based on computing resources, such as bandwidth, processing speeds, display capabilities, and the like. One specific issue is limited camera location. For example, if a camera on a device is located at the top of the device, and a current speaker is displayed in a bottom corner of the device, it can appear, to the speaker that viewer is looking away from, rather than looking in the general direction of the speaker. Alternatively, the viewer can look at the camera to give the impression of eye contact, but then only be able to view the speaker out of the periphery of their vision. This can have a negative effect for any or all of the participants and/or on the overall communication between the parties.

Embodiments of the present disclosure can include one or more cameras/sensors, where at least one camera is an under display camera. The under display camera(s) can be placed underneath a typical screen and have a normal display on top of the camera. The under screen camera/sensor can capture data without being affected by the display on top of the camera. This can allow for a much broader placement of cameras. For example, a camera can be placed in the center of a screen, rather than on a border of the device outside of the viewing area, or on different surface (e.g., back side of the device). Having one or more under screen cameras can allow a user to view a speaker with a camera behind the speaker on the display. Thus, it appears to the speaker the viewer is looking directly at them. Additionally, the viewer can look directly at the face of the speaker making it easier to capture non-verbal portions of speech presented by the speaker.

Embodiments of the present disclosure include a camera manager (activation manager, camera activation manager). In some embodiments, the camera manager can dynamically change which camera is in use/activated on the multi camera device. In some embodiments, the activated camera can be the camera closest to the relative location of a speaker on the display. Embodiments of the present disclosure can determine the location of the one or more cameras, the relative location of one or more speakers to the display, and a best effect region for each camera. The activation of a camera can be based on the location of the cameras, the best effect region for each camera, and the relative location of each speaker.

In some embodiments, the camera manager determines a video call has been initiated. The video call can be associated with one or more applications. In some embodiments, the video call can be initiated before the activation manager or the activation manager before the video call. The video call and/or the application can allow for audio and visual communication between multiple devices. The devices can be connected by a network (e.g., the internet).

In some embodiments, the activation manager can determine the location of the two or more cameras on a local device. In some embodiments, the activation manager determines a best effect region for each camera. The best effect region can be a portion of the display around a camera that provides a best effect for looking directly at an active feed. The best effect region can be generated relative to each camera (e.g., a circle around the camera of X diameter). In some embodiments, the best effect region(s) can cover the entire screen. Each portion of the screen can be in the best effect region of the closest camera.

In some embodiments, the camera manager can alter the location of each incoming feed on the display. In some embodiments, the altering includes moving and/or adjusting the size of the incoming feed display. In some embodiments, the feed display is moved into a best effect region for one of the cameras.

In some embodiments, the camera manager can determine which feed is active. The active feed can be a feed in the active call that is providing the most data. In some embodiments, the active feed can be the feed that is providing audio feed (e.g., current speaker). In some embodiments, determining the active feed can be based on several factors including, application settings (e.g., mute, screen share, etc.), data feeds, account designations (e.g., presenter, host, etc.). and the like.

In some embodiments, the camera manager activates the camera associated with the location of the speaker. Said differently, the activated camera is a camera within the best effect region (or closest to the best effect region) for the current speaker. Thus, the user can look at the speaker on the device, and be closer to looking at the camera. This can make it appear to the speaker that the user is making eye contact rather than looking toward a different portion of the screen. In some embodiments, the location of the speaker can be adjusted to align with a best effect region, and that camera can be activated.

In some embodiments, in response to determining a second feed is active (e.g., second remote device providing audio), a different camera, associated with the second feed is activated, and the first camera deactivated. Again, the user can shift his view to the new speaker.

Overall, embodiments of the present disclosure can increase the effectiveness and realism of video conferencing. Various embodiments can adjust speaker locations, and activate different cameras so a user can look more directly toward the speaker. This can provide the effect that two persons are talking face to face rather than on a video call. This better imitates non video communication.

The aforementioned advantages are example advantages, and embodiments exist that can contain all, some, or none of the aforementioned advantages while remaining within the spirit and scope of the present disclosure.

Figure 4:
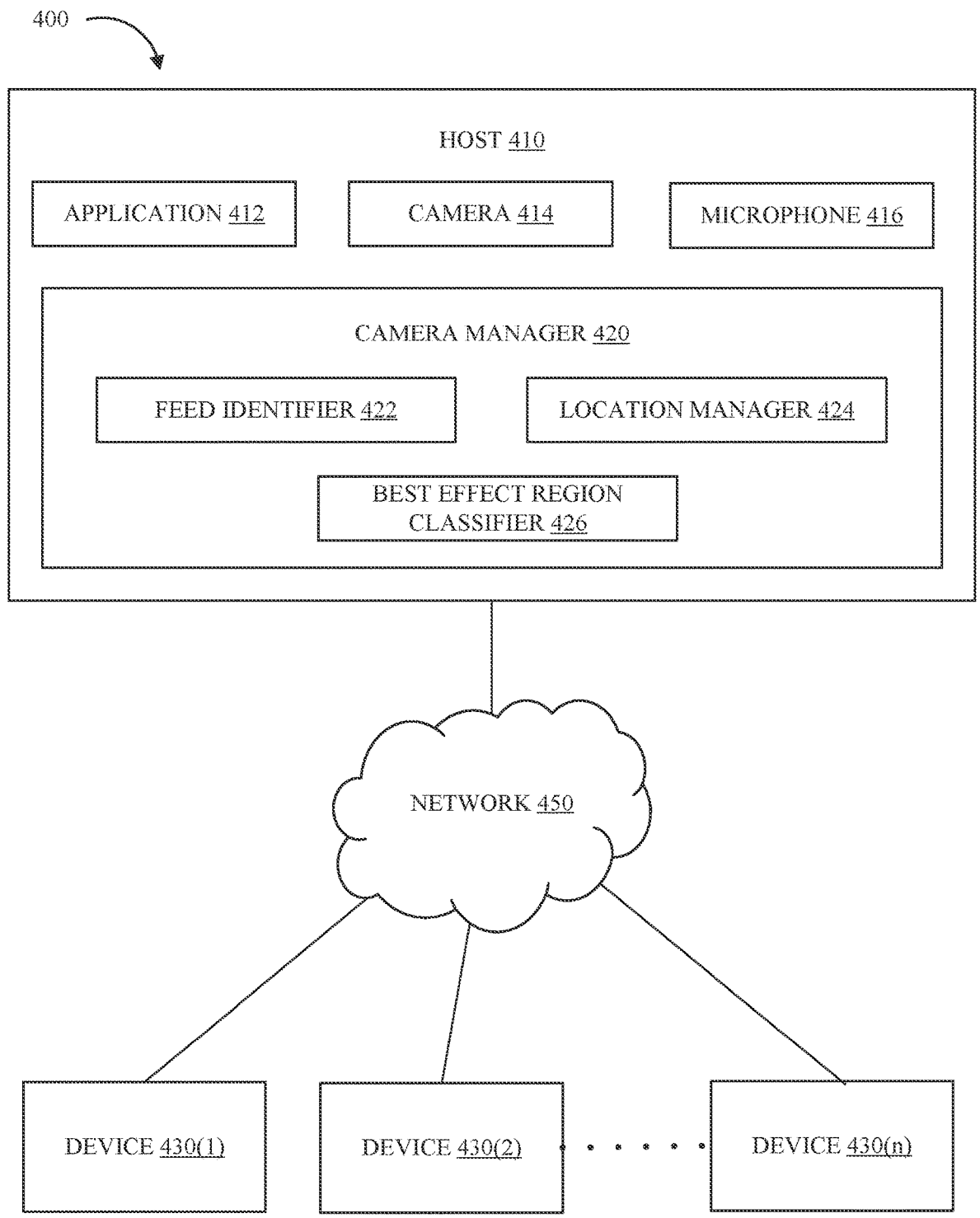
FIG. 4 illustrates a functional diagram of a computing environment suitable for operation of a camera manager in accordance with some embodiments of the present disclosure.

Referring now to various embodiments of the disclosure in more detail, FIG. 4 is a representation of a computing environment 400, that is capable of running a camera manager in accordance with one or more embodiments of the present disclosure. Many modifications to the depicted environment may be made by those skilled in the art without departing from the scope of the disclosure.

Computing environment 400 includes host 410, device 430(1), device 430(2), up to device 430(n), and network 450. Device 430(1), device 430(2), up to device 430(n), can include any number of devices. device 430(1), device 430(2), up to device 430(n), can be referred to collectively individually, or representative as device 430.

Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between and among host 410, device 430, and other computing devices (not shown) within computing environment 400. In some embodiments, each of host 410, and device 430 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes application 412, camera 414, microphone 416, and camera manager 420.

Application 412 can be any combination of hardware and/or software configured to carry out a function on a computing device (e.g., host 410). In some embodiments, application 412 is a web application. In some embodiments, chat application 412 includes video and audio communication capabilities (e.g., web conference, video chat, etc.). Sensors (e.g., microphone and camera) can capture input from a first device and send that data to be output on one or more connected devices. In some embodiments, Application 412 includes camera manager 420, however they are shown as separate for discussion purposes. In some embodiments, application 412 can be configured to perform one or more functions on a cloud computing network (e.g., cloud computing environment 50 shown in FIG. 1).

Camera 414 can be any combination of hardware and/or software configured to capture video data feed. In some embodiments, camera 414 includes two or more individual cameras. There can be any number of cameras on host 410.

In some embodiments, at least one of the cameras is located under the display area of the device.

Microphone 416 can be any combination of hardware and/or software configured to capture sound in the vicinity of the device. In some embodiments, microphone 416 can capture sound and convert it to a digital format to be send to a remote device. Microphone 416 can be integrated with host 410, application 412, one of more cameras 414 and/or camera manager 420.

Camera manager 420 can be any combination of hardware and/or software configured to activate and/or deactivate camera 414. In some embodiments, the activation can be configured to improve appearance of eye contact for a subject device (e.g., host 410). In some embodiments, a camera manager can be operating on one or more remote devices along with the subject device simultaneously. Improved relative eye contact can be determined from a speaker's perspective, where the speaker is a user on a remote device (e.g., not the subject device). In some embodiments, the activation includes changing/switching an active camera on the subject device. In some embodiments, a particular camera is activated based on the camera's location relative to a best effect region associated with an active data feed. In some embodiments, camera manager 420 includes feed identifier 422, location manager 424, and best effect regions classifier 426.

Feed identifier 422 can be any combination of hardware and/or software configured to determine/identity a feed currently active on a device. In some embodiments, the active feed is the feed correlated to an account participating video chat. In some embodiments, determining the active feed is based on the size of a feed coming from each device in the call. The highest data feed can be the active account. In some embodiments, the active feed can alternate between various accounts. In some embodiments, the active feed cannot be correlated to the subject device, it can only be correlated to a remote device. In some embodiments, determining the active feed can be based on information received from application 412. Various current chat application include functionality to indicate an active feed. In some embodiments, feed identifier 422 can analyze the feed coming from each device, including a type of data and changes in feed to determine an active feed.

Location manager 424 can be any combination of hardware and/or software configured to determine/identify location of display for each feed on the subject device. In some embodiments, at least one feed from a remote device will be correlated to a portion of the display on the subject device. This portion of the screen can display the video feed. In some embodiments, the determination of location is based on analyzing data from application 412. In some embodiments, the determination is based on analyzing the data associated with the display. In some embodiments, location manager 424 can alter the location a feed is displayed on the screen. The alteration can include changing the size (amount) of screen used to display, changing the shape, and/or moving the display to a different portion of the screen.

Best effect region classifier 426 can be any combination of hardware and/or software configured to identify a best effect region of the display for each camera. In some embodiments, the best effect region can be a region of the display to increase the appearance of eye contact with a speaker. The best effect region can be based on distance/shape from the camera (e.g., a circle of specified diameter around a camera). Thus, there can be overlapping best effect regions, or said differently, one portion of the display can be a best effect region for two or more cameras. Also, there can be portions of the display that are outside of a best effect region. In some embodiments, all of the display is included in at least one best effect region. Here, the distance/shape from each camera (e.g., circles) can be expanded until the entire display is part of one. In some embodiments, the best effect area for each point in the display is the closest camera. Hence, there may be no overlapping areas.

Device 430 can be any combination of hardware and/or software configured to communicate with host 410 by video conference/chat. In some embodiments, there can be any number of devices 430. In some embodiments, device 430 includes an application consistent with application 412 (e.g., video call application). The application can communicate feed data and/or receive data from host 410. In some embodiments, one device 430 (e.g., device 430(2)), can be a feed hub. The feed hub can be a device where all the feeds pass through prior to being send to each other device in the video chat.

Figure 5:
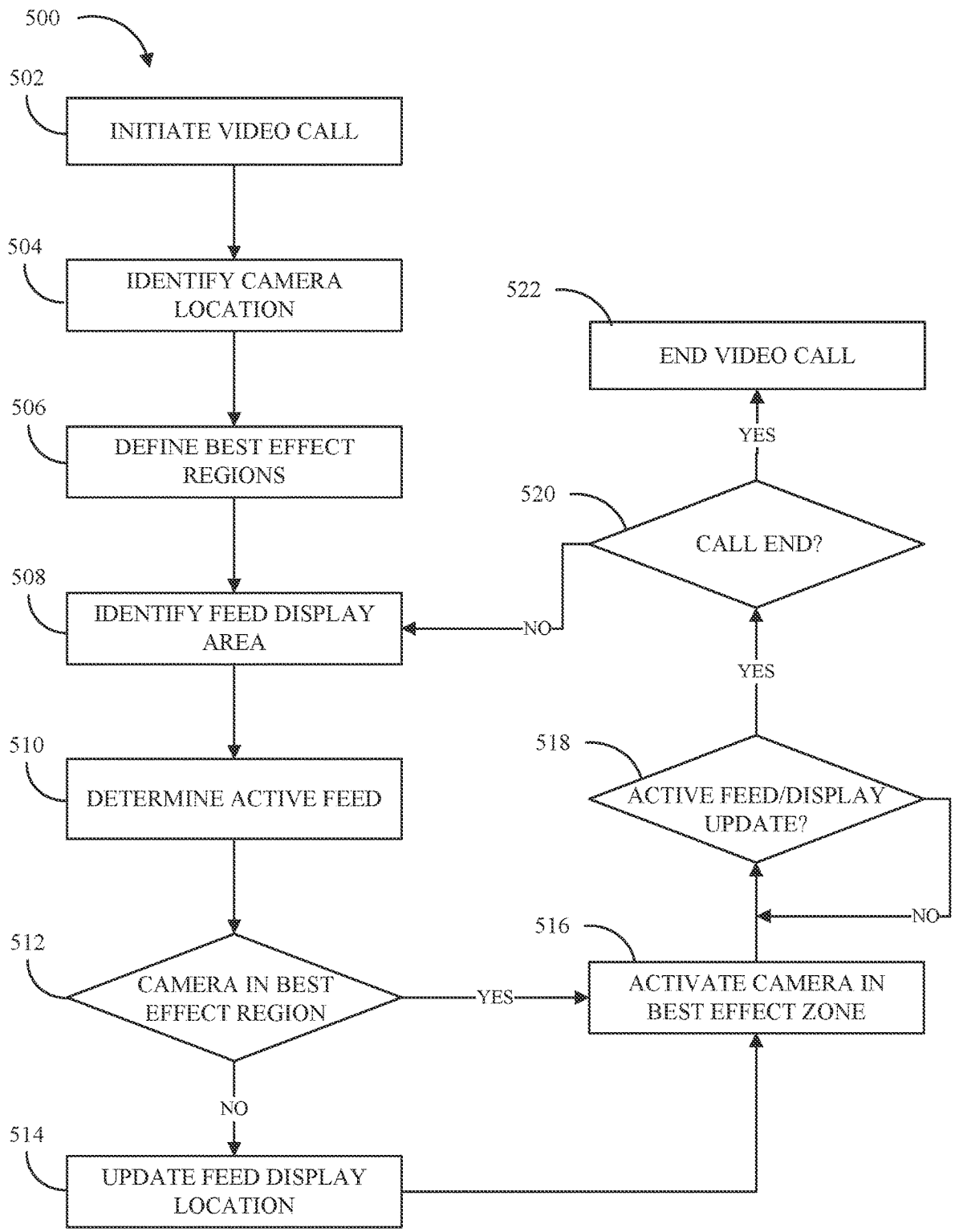
FIG. 5 illustrates a flow chart of an example method to active a behind screen camera in a feed display area, in accordance with some embodiments of the present disclosure.

FIG. 5 depicts a flowchart of an example method, method 500, for activating cameras in a best effect region of a display that can be performed in a computing environment (e.g., computing environment 400 and/or cloud computing environment 50). One or more of the advantages and improvements described above for operating a camera manager (e.g., camera manager 420) may be realized by method 500, consistent with various embodiments of the present disclosure.

Method 500 can be implemented by one or more processors, host 410, application 412, camera 414, microphone 416, camera manager 420, feed identifier 422, location manager 424, bet effect region classifier 426, device 430 and/or a different combination of hardware and/or software. In various embodiments, the various operations of method 500 are performed by one or more of host 410, application 412, camera 414, microphone 416, camera manager 420, feed identifier 422, and location manager 424. For illustrative purposes, the method 500 will be described as being performed by camera manager 420.

At operation 502, camera manager 420 initiates a video call (or video conference, video chat, etc.). A video call can be any communication between two or more devices where the video and audio feed are captured at each device and sent to each of the other devices in the call. In some embodiments, application 412 can initiate the video call and/or add functionality (e.g., screen sharing, speaker identification, etc.) to the video call. In some embodiments, operation 502 can include initiating a default camera. Any of the two or more cameras can be designated as the default camera.

At operation 504, camera manager 420 identifies a location for each camera on a device. In some embodiments, the camera location is retrieved from the device. The device can interface with camera manager 420 to provide location data for each camera, including if the camera is an under display camera. In some embodiments, the device includes at least two cameras, where at least one is an under display camera. In some embodiments, the location is identified by location manager 424.

At operation 506, camera manager 420 determines a best effect region for each camera. In some embodiments, the best effect region is based on a distance from the camera. The various best effect regions can be the same or different in relative size and shape. For example, all best effect regions can be circles of a specified diameter (radius, or circumference) around each camera. Each specified diameter can be the same or different than one or more other best effect regions (e.g., See FIGS. 6A and 6B). As another example, the best effect region can be a relatively large circle for a first camera, and a relatively small square for a second camera. In some embodiments, the camera can be within any portion of the best effect regions (e.g., middle, edge, etc.). In some embodiments, each portion of the screen can be included in one best effect region. The best effect regions do not need a particular/defined shape. In some embodiments, best effect regions can overlap. The overlap means a portion of the display can be included in two or more best effect regions.

In some embodiments, operations 504 and 506 can be performed prior to initiating the video call (operation 502). The best effect region can be defined for the device, and/or for a particular application (e.g., a first application and a second applicant can have different best effect regions on the same device).

At operation 508, camera manager 420 determines a display location for each feed on the subject device. The display location can be the portion of the display used to display content related to a specific feed. Generally, the display will show the input from a camera on a device associated with the feed. In some embodiments, the display location is received from application 412 and/or host 410. The application and the host 410 that is processing the call will include location information for where to display the data on the display. In some embodiments, camera manager 420 can analyze the display to determine where various feeds are being displayed.

At operation 510, camera manager 420 identifies an active feed. The active feed can be the feed from a remote device correlated to a user speaking at that time. In some embodiments, the active feed is obtained/received from application 412. In some embodiments, the active feed is determined based on analyzing the incoming feed. The incoming feed that has the highest amount of throughput can be the active feed. Alternatively, the active feed can be the feed with highest audio throughput. For example, if a first account is sharing a screen, and a second account is speaking, the video related to a screen share can be bigger (e.g., more data) than the speaker, but the speaker would be the active feed based on the audio feed.

At operation 512, camera manager 420 determines if the display area for the active feed is located in a best effect region. In some embodiments, the display location of the active feed can be compared against the best effect locations. If the areas overlap, they can be in the same region. In some embodiments, operation 512 includes calculating a percentage of the feed display within a best effect region. In some embodiments, a predetermined amount of the feed display must be in a best effect region to be in the best effect region. The predetermined amount can be any (e.g., 0.01%) or relatively high (e.g., >75%). In some embodiments, the feed display area can be included in two or more best effect regions. In this case, the active feed display may be considered in any of the regions in which it overlaps. Alternatively, the active feed can be considered to be in a single best effect region at a time. In this scenario, the regions with the biggest overlap percentage can be the identified best effect region.

If it is determined the active feed display is within a best effect region (512:YES), then camera manager 420 proceeds to operation 516. If it is determined the active feed display is not within a best effect region (512:NO), then camera manager 420 proceeds to operation 514.

At operation 514, camera manager 420 updates feed display locations. In some embodiments, the update can move one or more feed displays to be correlated to at least one best effect region. In some embodiments, the update includes moving the active feed display into a best effect region. Upon completion of operation 514, camera manager 420 proceeds to operation 516

In some embodiments, operation 514 can be performed concurrent with, or in response to operation 506 (e.g., before/incorporating operation 512). As such, the display can be such that each feed display area is within at least one best effect region. This can reduce the number of transitions of the display.

At operation 516, camera manager 420 activates the camera associated with the best effect zone and the active feed. In some embodiments, the camera within the best effect region (or the best effect region with the highest overlap) is turned on, and the other cameras are turned off/deactivated. If, there is not a best effect region that corresponds to the active feed display area, then a default camera can be initiated or the camera associated to the closest best effect region can be active.

At operation 518 camera manager 420 determines if there is a change to the display and/or the active feed. An active feed change can be when a user associated with a non-active feed begins speaking and/or the user associated with the active feed stops speaking. In some embodiments, the feeds are continuously monitored. In some embodiments, determining a change in active feed can include the processes and analysis of operation 510.

A display change can be when the location of one or more feed display locations changes. The change can be adding and/or removing a feed (e.g., new party joining the call), changing the size of one or more areas, and/or moving the feed display location. In some embodiments, the location change can include the same processes and analysis of operation 508.

If it is determined there is a change in the active feed and/or the display (518:YES), then camera manager 420 proceeds to operation 520. If it is determined there is no change in the active feed and/or the display (518:NO), then camera manager 420 continues to monitor for a change in operation 518 by repeating operation 518.

At operation 520, camera manager 420 determines whether the call is ended. In some embodiments, the call is ended when the subject device exits the call. The indication the call is over can be obtained/received from application 412. If it is determined the call has ended (520:YES), then camera manager 420 proceeds to operation 522. If it is determined the call is not ended (520:NO), then camera manager 420 returns to operation 508.

FIG. 6A through 6D depict one embodiment of a subject device (e.g., host 410). The subject device 600 includes speaker 605, microphone 610, display 620 and two or more cameras 615, where each camera is depicted by a circle. Subject device 600 includes six cameras. Five of the six cameras are under display cameras, and the remaining camera is outside the display area.

Figure 6B:
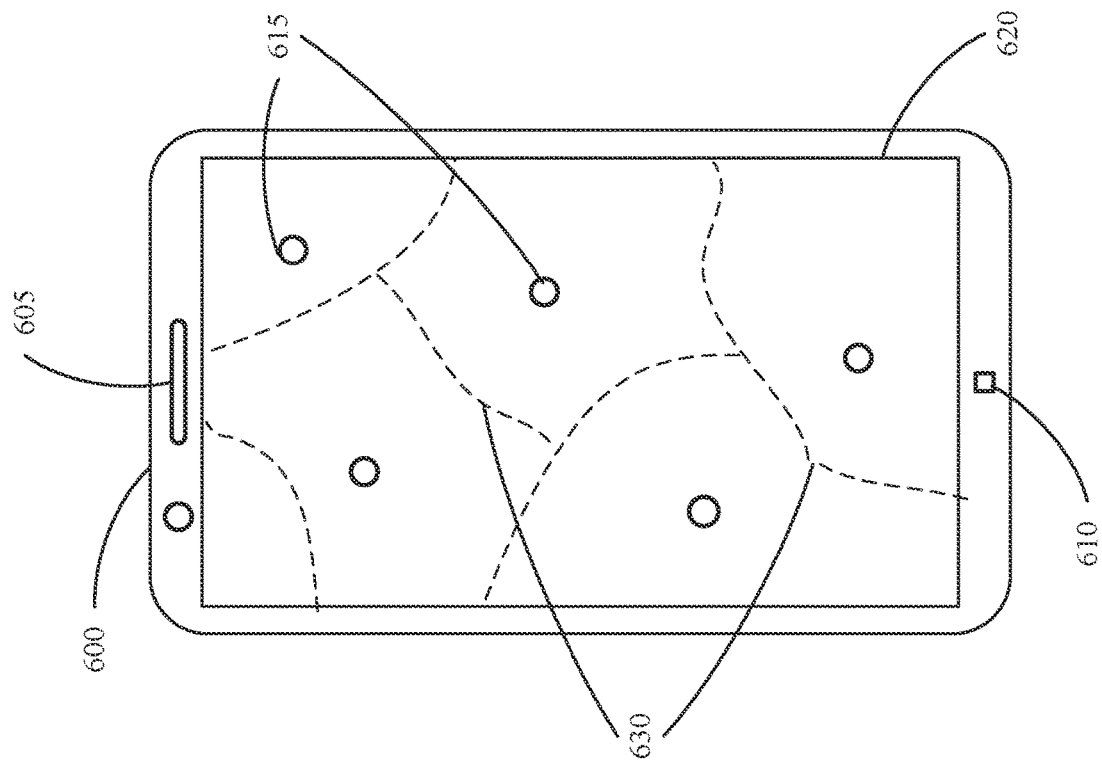
FIG. 6A-6D illustrate embodiments of a subject device depicting best effect regions and/or feed display areas.
Figure 6A:
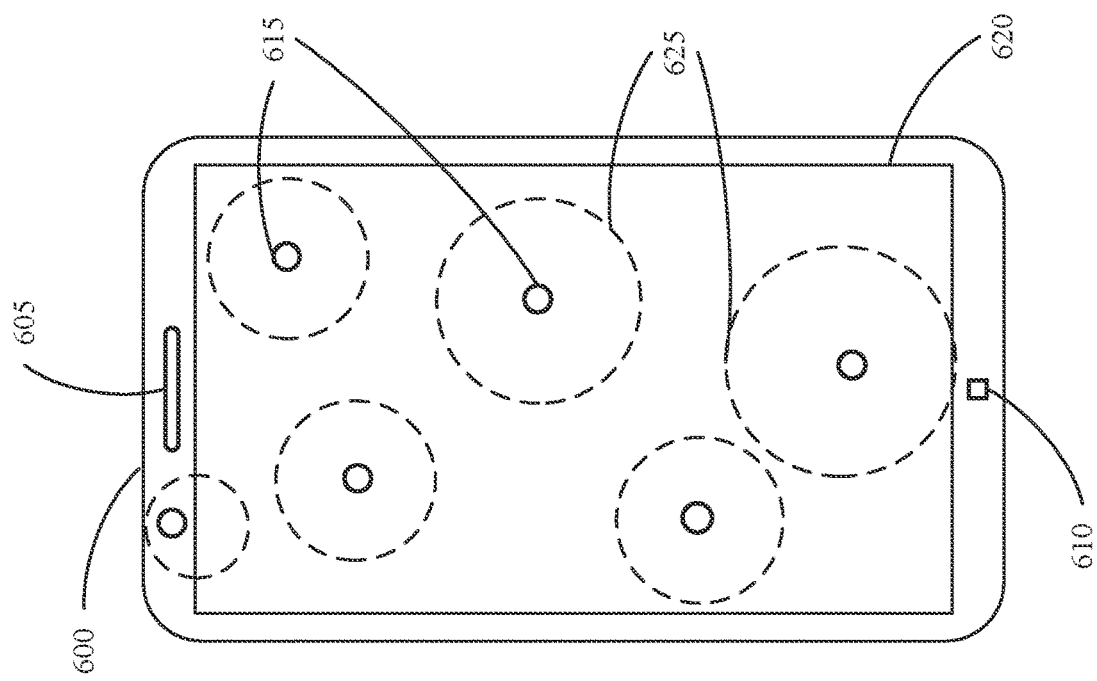

FIG. 6A includes one embodiment of best effect regions for each camera. The best effect regions 625 are depicted by dashed circles. In this embodiment, each best effect region 625 has the same shape, but different sizes, and various portions of the display are outside of any best effect regions.

FIG. 6B includes one embodiments of best effect regions for each camera where all portions of the screen are in a best effect region. The boundary of each region is marked by dashed line 630. In this embodiment, the best effect regions have no defined shape. Each location on the screen is correlated to one camera.

Figure 6D:
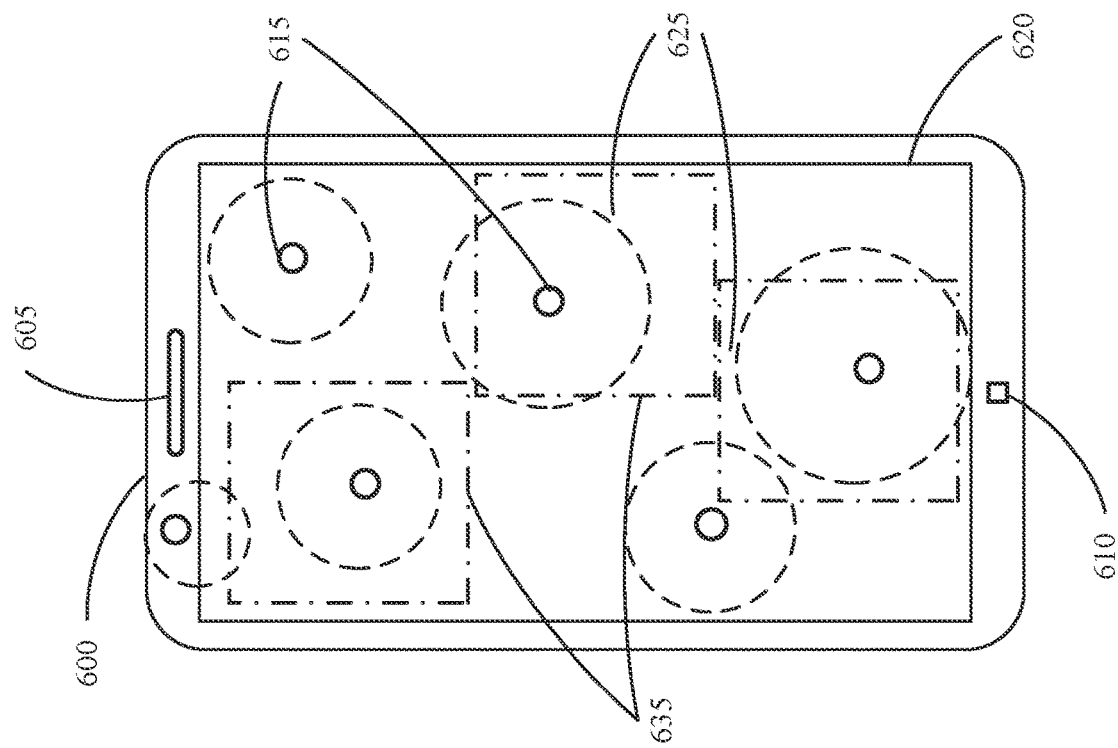
Figure 6C:
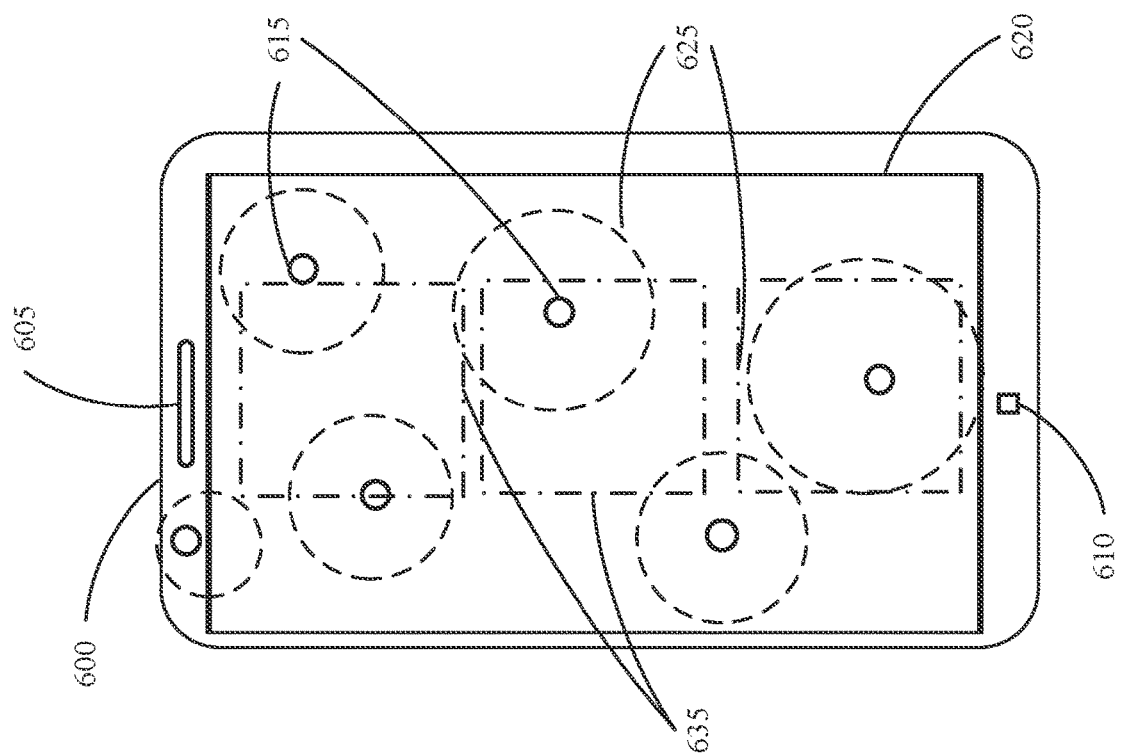

FIG. 6C includes one embodiment of subject device 600 with three feed display areas 635 represented by the dashed squares. This correlated to operation 508. Based on the embodiment, it can be determined that there is no camera 615 in one or more feed display area 635, or there is not enough overlap between the best effect region 625 and the feed display area 635.

FIG. 6D displays the best effect regions of FIG. 6A after adjusting the locations of the feed displays 635 (for example as described above with reference to operation 514), such that each feed display is overlapping at least one best effect area. As such, camera manager 420 can activate any of the associated cameras when it is determined the particular feed is the active feed. Whenever a remote user is speaking, the user of the subject device 600 can look at the remote user and it will appear, to the remote user, as if the local user is looking at them, rather than a different portion of the screen. Thus, camera manager 420 can enable a conversational experience that is more similar to real face to face communications.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying a location for each of two or more cameras on a device, wherein a first camera of the two or more cameras located under a display of the device;
   defining, for each camera, a best effect region on the display including a first best effect region for the first camera;
   identifying, for each of one or more feeds, a feed display area including a first feed display area, where each feed display area uses a portion of the display; and
   activating the first camera for a first feed, wherein the first feed has a first feed display area that overlaps the first best effect region.

2. The method of claim 1, further comprising:
   determining the first feed is an active feed, and wherein the activating the first camera is in response to determining the first feed is the active feed.

3. The method of claim 2, further comprising:
   initiating a video call, wherein the video call includes the device and at least one remote device and each remote device is associated with one of the one or more feeds.

4. The method of claim 3, wherein the active feed is based on the first feed including audio data from a first remote device.

5. The method of claim 1, further comprising:
   adjusting the display such that each feed display area is correlated to at least one of the two or more cameras.

6. The method of claim 1, further comprising:
   determining the first feed does not overlap the first best effect region; and
   adjusting the first feed display area to overlap the first best effect region.

7. The method of claim 1, further comprising:
   determining a second feed of the one or more feeds becomes the active feed;
   activating a second camera, wherein the second camera is an under display camera, and a second best effect region associated with the second camera overlaps a second feed display area.

8. The method of claim 1, wherein each best effect region is a circle of equal diameter with the associated camera at the center of the best effect region.

9. The method of claim 1, wherein, each portion of the display is included in at least one best effect region.

10. The method of claim 1, wherein the first feed display area overlaps the first best effect region if an amount of shared display area exceeds a predetermined threshold.

11. The method of claim 1, wherein the best effect region is configured to simulate eye contact between user of the device and a user associated with the first feed.

12. A system comprising:
    a processor; and
    a computer-readable storage medium communicatively coupled to the processor and storing program instructions which, when executed by the processor, are configured to cause the processor to:
    identify a location for each of two or more cameras on a device, wherein a first camera of the two or more cameras located under a display of the device;
    define, for each camera, a best effect region on the display including a first best effect region for the first camera;
    identify, for each of one or more feeds, a feed display area including a first feed display area, where each feed display area uses a portion of the display; and
    activate the first camera for a first feed, wherein the first feed has a first feed display area that overlaps the first best effect region.

13. The system of claim 12, wherein the program instructions are further configured to cause the processor to:
    determine the first feed is an active feed, and wherein the activating the camera is response to determining the first feed is the active feed.

14. The system of claim 13, wherein the program instructions are further configured to cause the processor to:
    initiate a video call, wherein the video call includes the device and at least one remote device and each remote device is associated with one of the one or more feeds.

15. The system of claim 14, wherein the program instructions are further configured to cause the processor to:
    adjusting the display such that each feed display area is correlated to at least one.

16. The system of claim 12, wherein the program instructions are further configured to cause the processor to:
    adjust the display such that each feed display area is correlated to at least one.

17. A computer program product, the computer program product comprising a computer readable storage medium having program instructions embodied therewith, the program instructions executable by a processing unit to cause the processing unit to:
    identify a location for each of two or more cameras on a device, wherein a first camera of the two or more cameras located under a display of the device;
    define, for each camera, a best effect region on the display including a first best effect region for the first camera;
    identify, for each of one or more feeds, a feed display area including a first feed display area, where each feed display area uses a portion of the display; and
    activate the first camera for a first feed, wherein the first feed has a first feed display area that overlaps the first best effect region.

18. The computer program product of claim 17, wherein the program instructions are further configured to cause the processing unit to:
   determine the first feed is an active feed, and wherein the activating the camera is response to determining the first feed is the active feed.

19. The computer program product of claim 18, wherein the program instructions are further configured to cause the processing unit to:
   initiate a video call, wherein the video call includes the device and at least one remote device and each remote device is associated with one of the one or more feeds.

20. The computer program product of claim 19, wherein the program instructions are further configured to cause the processing unit to:
   adjusting the display such that each feed display area is correlated to at least one.

\* \* \* \* \*